US010970188B1

(12) United States Patent
Åvist et al.

(10) Patent No.: US 10,970,188 B1
(45) Date of Patent: Apr. 6, 2021

(54) SYSTEM FOR IMPROVING CYBERSECURITY AND A METHOD THEREFOR

(71) Applicant: HoxHunt Oy, Helsinki (FI)

(72) Inventors: Pyry Åvist, Espoo (FI); Mika Aalto, Helsinki (FI); Pasi Salo, Helsinki (FI); Karri Kurunmäki, Helsinki (FI)

(73) Assignee: HoxHunt Oy, Helsinki (FI)

( * ) Notice: Subject to any disclaimer, the term of this patent is extended or adjusted under 35 U.S.C. 154(b) by 0 days.

(21) Appl. No.: 16/787,620

(22) Filed: Feb. 11, 2020

(51) Int. Cl.
H04L 29/06 (2006.01)
G06F 11/34 (2006.01)
G06N 20/00 (2019.01)
G06F 9/445 (2018.01)

(52) U.S. Cl.
CPC ...... *G06F 11/3438* (2013.01); *G06F 9/44526* (2013.01); *G06N 20/00* (2019.01); *H04L 63/1416* (2013.01); *H04L 63/1441* (2013.01)

(58) Field of Classification Search
CPC ............. G06F 11/3438; G06F 9/44526; H04L 63/1441; H04L 63/1416; G06N 20/00
See application file for complete search history.

(56) References Cited

U.S. PATENT DOCUMENTS

2017/0104778 A1* 4/2017 Shabtai ................. G06F 21/552
2017/0244746 A1* 8/2017 Hawthorn ........... H04L 63/1408
2020/0104777 A1* 4/2020 Bouhini ................ G06N 20/00

* cited by examiner

*Primary Examiner* — Kim T Nguyen
(74) *Attorney, Agent, or Firm* — Ziegler IP Law Group, LLC

(57) ABSTRACT

A system for improving cybersecurity includes a server configured to define a group of users associated with corresponding user devices, send calibration vectors to user devices, receive actions performed calibration vectors by users, allocate users in the group to one of sub-groups based on received actions, send a set of simulated vectors to user devices associated with users allocated to a particular sub-group, receive actions performed on the simulated vectors by each of the users in the subgroups, define a threshold expertise level for the subgroups, receive, one or more threat vectors reported by one or more users allocated to the sub-groups having the expertise level above the threshold expertise level, update the set of simulated vectors based on the received threat vector, and use the updated set of simulated vectors as training vectors for the each of the users allocated to a particular subgroup to improve cybersecurity.

24 Claims, 7 Drawing Sheets

SYSTEM FOR IMPROVING CYBERSECURITY AND A METHOD THEREFOR

TECHNICAL FIELD

The present disclosure relates generally to cybersecurity systems; and more specifically, to systems and methods that provide training to individuals for improving cybersecurity in an organisation. The present disclosure also relates to machine learning based system and methods for preventing cyber-attacks.

BACKGROUND

Corporations and other organizations are vulnerable to a variety of threats. In the era of information technology, organizations are primarily prone to cyber-attacks. The most common cyber-attacks and threats that compromise individual users, corporations and organizations are for example ransomware, phishing attacks, text lures, look-a-like domain, brand impersonation, social graph. Cyber-attacks can result in a direct loss of money, loss of confidential information which later can be monetized, loss of infrastructure availability, loss of data integrity, loss of customer confidence, loss of brand value, and other losses. Cyber-attacks may take a variety of forms including, but not limited to, employee theft, embezzlement, robbery, sabotage, infection with computer viruses, compromised credit card accounts, database invasions, and others. For example, phishing today has become one of the most challenging security concerns across all industries. Phishing typically involves a fraudulent attempt to obtain sensitive information such as usernames, passwords and credit card details by disguising as a trustworthy entity in an electronic communication and generally affects organizations of all sizes. Generally, it takes the advantage of the weakest link in security, the human element. Therefore, it is of utmost importance to provide training to individuals to reduce the chances of falling prey to an attack.

Conventionally, several computer-based training systems have been developed for training individuals to enhance awareness of the individual towards cyber-attack. However, there are several problems associated with the conventional training systems. One of the problems being that the conventional training systems follow a one-size-fit approach for designing training material for all individual. These modules may come in many different forms, including videos, presentations, simulations, training games and the like provided to each individual. The problem with such an approach is that it does not consider the fact that every individual requires specific or different level of training for different threats. The existing training systems do not have the potential to dynamically adapt according to the individual needs. Another problem with such an approach is that the training systems are not constantly updated with the ever evolving new threats.

Therefore, in light of the foregoing discussion, there exists a need to overcome the aforementioned limitations associated with the conventional training systems for improving cybersecurity in an organization.

SUMMARY

The present disclosure seeks to provide a system for improving cybersecurity. The present disclosure also seeks to provide a method for improving cybersecurity. The present disclosure seeks to provide a solution to the existing problem of one fit cybersecurity training programs that provide abstract training to individuals. An aim of the present disclosure is to provide a solution that overcomes at least partially the problems encountered in prior art, and provides a context-based system for improving cybersecurity in an efficient and targeted manner.

In one aspect, an embodiment of the present disclosure provides a system for improving cybersecurity in an organization, the system comprising a server arrangement configured to:
define a group of users in the organization, each of the users in the group of users associated with a user device;
send one or more calibration vectors to each of the user devices associated with the users in the group of users;
receive, from the user devices, one or more actions performed on each of the one or more calibration vectors by each of the users in the group of users;
allocate each user in the group of users to one of sub-groups based on the received actions, wherein each of the sub-groups is associated with an expertise level;
send a set of simulated vectors to each of the user devices associated with users allocated to a particular sub-group, wherein the set of simulated vectors pertains to a difficulty level corresponding to the expertise level of the sub-group;
receive, from the user devices, one or more actions performed on each of the simulated vectors in the set of simulated vectors by each of the users in the sub-groups;
define a threshold expertise level for the sub-groups;
receive, from the user devices, one or more threat vectors reported by one or more users allocated to the sub-groups having the expertise level above the threshold expertise level;
update the set of simulated vectors based on the received threat vector; and
use the updated set of simulated vectors as training vectors for the each of the users allocated to a particular sub-group to improve cybersecurity.

In another aspect, an embodiment of the present disclosure provides a method for improving cybersecurity in an organization, the method comprising:
defining a group of users in the organization, each of the users in the group of users associated with a user device;
sending one or more calibration vectors to each of the user devices associated with each of the users in the group of users;
receiving, from the user devices, one or more actions performed on each of the one or more calibration vectors by each of the users in the group of users;
allocating each user in the group of users to one of sub-groups based on the received actions, wherein each of the sub-groups is associated with an expertise level;
sending a set of simulated vectors to each of the user devices associated with users allocated to a particular sub-group, wherein the set of simulated vectors pertains to a difficulty level corresponding to the expertise level of the sub-group;
receiving, from the user devices, one or more actions performed on each of the simulated vectors in the set of simulated vectors by each of the users in the sub-groups;
defining a threshold expertise level for the sub-groups;

receiving, from the user devices, one or more threat vectors reported by one or more users allocated to the sub-groups having the expertise level above the threshold expertise level;

updating the set of simulated vectors based on the received threat vector; and using the updated set of simulated vectors as training vectors for the each of the users allocated to a particular sub-group to improve cybersecurity.

Embodiments of the present disclosure substantially eliminate or at least partially address the aforementioned problems in the prior art, and enables better target training to match individual needs to maximize performance while minimizing amount of training vectors and sessions required and mitigate consequences associated with cyber-attacks.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
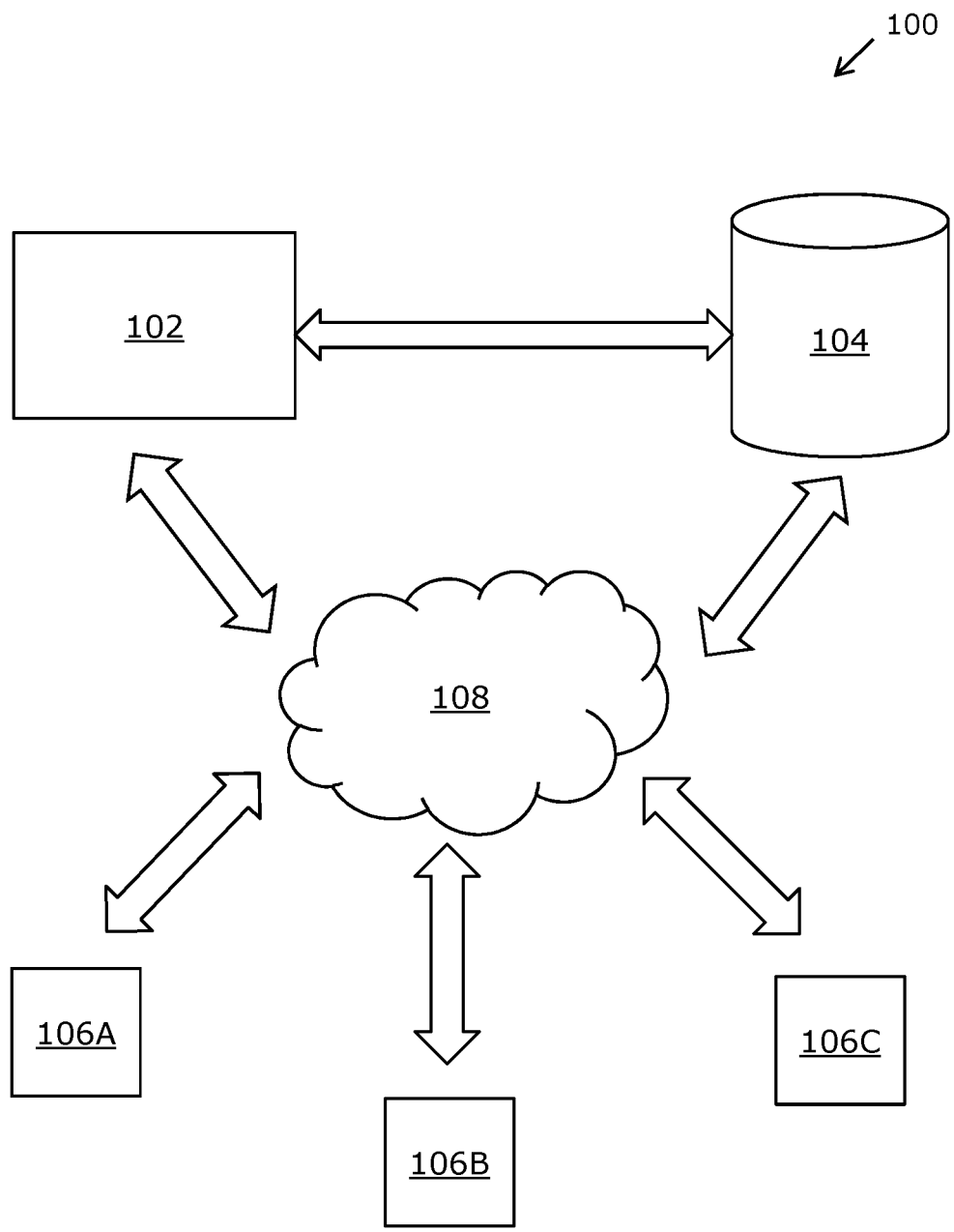
FIG. 1 is a schematic illustration of an exemplary environment of a system for improving cybersecurity in an organization, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for improving cybersecurity in an organization, the system comprising a server arrangement configured to:

define a group of users in the organization, each of the users in the group of users associated with a user device;

send one or more calibration vectors to each of the user devices associated with the users in the group of users;

receive, from the user devices, one or more actions performed on each of the one or more calibration vectors by each of the users in the group of users;

allocate each user in the group of users to one of sub-groups based on the received actions, wherein each of the sub-groups is associated with an expertise level;

send a set of simulated vectors to each of the user devices associated with users allocated to a particular sub-group, wherein the set of simulated vectors pertains to a difficulty level corresponding to the expertise level of the sub-group;

receive, from the user devices, one or more actions performed on each of the simulated vectors in the set of simulated vectors by each of the users in the sub-groups;

define a threshold expertise level for the sub-groups;

receive, from the user devices, one or more threat vectors reported by one or more users allocated to the sub-groups having the expertise level above the threshold expertise level;

update the set of simulated vectors based on the received threat vector; and use the updated set of simulated vectors as training vectors for the each of the users allocated to a particular sub-group to improve cybersecurity.

In another aspect, an embodiment of the present disclosure provides a method for improving cybersecurity in an organization, the method comprising:

defining a group of users in the organization, each of the users in the group of users associated with a user device;

sending one or more calibration vectors to each of the user devices associated with each of the users in the group of users;

receiving, from the user devices, one or more actions performed on each of the one or more calibration vectors by each of the users in the group of users;

allocating each user in the group of users to one of sub-groups based on the received actions, wherein each of the sub-groups is associated with an expertise level;

sending a set of simulated vectors to each of the user devices associated with users allocated to a particular sub-group, wherein the set of simulated vectors pertains to a difficulty level corresponding to the expertise level of the sub-group;

receiving, from the user devices, one or more actions performed on each of the simulated vectors in the set of simulated vectors by each of the users in the sub-groups;

defining a threshold expertise level for the sub-groups;

receiving, from the user devices, one or more threat vectors reported by one or more users allocated to the sub-groups having the expertise level above the threshold expertise level;

updating the set of simulated vectors based on the received threat vector; and using the updated set of simulated vectors as training vectors for the each of the users allocated to a particular sub-group to improve cybersecurity.

The present disclosure provides a structured, streamlined and targeted training for each of the users in the organization by providing simulated attacks on users in the organization. The embodiments of the present disclosure include computer-implemented systems and methods used to train a machine learning algorithm to selectively prioritize the areas where the user needs to be trained and to selectively identify conditions where the delivery of the training is likely to be most effective. The present disclosure also provides systems and methods to generate automated individual learning paths for each of the users to provide customized training to each of the users and a means to track the progress of every user such that the training provided may be constantly updated in accordance with the learning of each of the users. Notably, the present disclosure takes into account the fact that the training required by the each of the users vary from one user to another based on the behaviors and activities performed by a particular user and based on the behaviors and activities performed by all users. Therefore, the training vectors are designed as such to match a skill and awareness of each of the user in the organization. Notably, such a system ensures targeted training, maximizes resulting awareness score even though user fails, and mitigates undesirable consequences associated with lack of proper training to identify cyber-attacks. Furthermore, the disclosed systems and methods to improve cybersecurity by performing automated actions to prevent the organization from cyber-attacks. Further, the systems and methods as disclosed herein makes it possible to reach near real-time threat analysis, sandboxing, and remediation. Using threat scoring, it is possible to identify accurate estimates of the current threat level facing the organization. The system simulates phishing attacks (vectors) that are indistinguishable from real threats, that are used for training the employees in the organization. Following on, a gamified reporting experience is rewarding employees (users) for reporting both simulated and real attacks, highlighting their success.

Throughout the present disclosure, the term "server arrangement" relates to an arrangement of at least one server configured to improve cybersecurity in the organization. The term "server" generally refers to an application, program, process or device in a client-server relationship that responds to requests for information or services by another application, program, process or device (a client) on a communication network. The term "server" also encompasses software that makes the act of serving information or providing services possible. Moreover, the term "client" generally refers to an application, program, process or device in a client-server relationship that requests information or services from another application, program, process or device (the server) on the communication network. Importantly, the terms "client" and "server" are relative since an application may be a client to one application but a server to another application. The term "client" also encompasses software that makes the connection between a requesting application, program, process or device and a server possible, such as an FTP client. Herein, the client may be the plurality of user devices that are communicatively coupled to the server arrangement via the communication network. Examples of the user devices include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, and desktop computers. It will be appreciated that the communication network can be an individual network, or a collection of individual networks that are interconnected with each other to function as a single large network. The communication network may be wired, wireless, or a combination thereof. Examples of the individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, radio networks, telecommunication networks, and Worldwide Interoperability for Microwave Access (WiMAX) networks.

It will be appreciated that the aforementioned server arrangement can be implemented in several ways. In an example, the at least one server of the server arrangement could be directly coupled in communication with a given entity device associated with a given user device, via the communication network. In such an example, the at least one server is configured to perform all the functions of improving cybersecurity. In another example, the server arrangement could have a distributed architecture wherein the server arrangement could comprise a plurality of servers that are coupled in communication with a given user device associated with a user, via the communication network. In such a case, there can be a first server (namely, a "front-end server") that is directly coupled in communication with the given entity device, and at least one server (namely, at least one "back-end serve") that is coupled in communication to the first server. In operation, the first server can be accessed by the given user using the given user device, via the communication network. In yet another example, server arrangement could be implemented by way of a cloud server arrangement.

Optionally, the system further comprises a database arrangement for storing known threat vectors, actions of each of the users on calibration vectors, actions of each of the users on simulated vectors, a progress of each of the each of the users and so forth. Herein, the server arrangement and the database arrangement form a computer system for the aforementioned system for improving cybersecurity in the organization. Throughout the present disclosure, the term "database arrangement" as used herein refers to arrangement of at least one database that when employed, allows for the server arrangement to store one or more actions performed by the one or more users on received vector, known vectors and the like. The term "database arrangement" generally refers to hardware, software, firmware, or a combination of these for storing information in an organized (namely, structured) manner, thereby, allowing for easy storage, access (namely, retrieval), updating and analysis of such information. The term "database arrangement" also encompasses database servers that provide the aforesaid database services to the server arrangement. It will be appreciated that the data repository is implemented by way of the database arrangement.

The computer system may include a processor and a memory. The processor may be one or more known processing devices, such as microprocessors manufactured by Intel™ or AMD™ or licensed by ARM. Processor may constitute a single core or multiple core processors that executes parallel processes simultaneously. For example, processor may be a single core processor configured with virtual processing technologies. In certain embodiments, processor may use logical processors to simultaneously execute and control multiple processes. Processor may implement virtual machine technologies, or other known technologies to provide the ability to execute, control, run, manipulate, and store multiple software processes, applications, programs, etc. In another embodiment, processor may include a multiple-core processor arrangement (e.g., dual, quad core, etc.) configured to provide parallel processing functionalities to allow computer system to execute multiple processes simultaneously. One of ordinary skill in the art would understand that other types of processor arrangements could be implemented that provide for the capabilities disclosed herein. Further, the memory may include a volatile or non-volatile, magnetic, semiconductor, solid-state, tape, optical, removable, non-removable, or other type of storage device or tangible (i.e., non-transitory) computer-readable medium that stores one or more program(s), such as app(s).

Program(s) may include operating systems (not shown) that perform known operating system functions when executed by one or more processors. By way of example, the operating systems may include Microsoft Windows™, Unix™, Linux™, Android™ and Apple™ operating systems, Personal Digital Assistant (PDA) type operating systems, such as Microsoft CE™, or other types of operating systems. Accordingly, disclosed embodiments may operate and function with computer systems running any type of operating system. The computer system may also include communication software that, when executed by a processor, provides communications with network and/or local network, such as Web browser software, tablet, or smart hand held device networking software, etc.

The present system can be deployed to third parties, for example an organization, as part of a service wherein a third party virtual private network (VPN) service is offered as a secure deployment vehicle or wherein a VPN is built on-demand as required for a specific deployment. A VPN is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site. Access to the software via a VPN can be provided as a service by specifically constructing the VPN for purposes of delivery or execution of the process software (i.e., the software resides elsewhere) wherein the lifetime of the VPN is limited to a given period of time or a given number of deployments based on an amount paid. In other examples, the present solution as a service can also be deployed and integrated into the IT infrastructure of the organisation.

In the present disclosure, the server arrangement is configured to define a group of users. Throughout the present disclosure the term "users" as used herein refers to individuals or employees in the organization that undergo training and play a role in improving cybersecurity in the organization. Herein, each of the users in the group of users are associated with a user device. That is, each user is associated with at least one user device that is configured to receive vectors, record one or more actions, as discussed later in the description.

Throughout the present disclosure, the term "organization" as used herein collectively refers to a business entity, a business organization, an enterprise, a company, etc. The organization may be a unit of human resources that is structured and managed to meet a need or to pursue collective goals. Typically, all organizations have a management structure that determines relationships between the different activities and the members, and subdivides and assigns roles, responsibilities, and authority to carry out different tasks. Organizations are, generally, open systems as they affect and are affected by their environment.

Optionally, all the users belonging to the same organization may be defined as one group. Optionally, the groups of users may be defined based different criteria. For example, different groups may be defined in the organization based on a geographical presence of users in the organization, different departments in the organization, different levels in the organization and so forth. In an example, an organization may have five departments, for example, sales, marketing, finance, human resources, and production. Herein, employees in the organization may be divided into five different group of users based on the departments thereof. In another example, an organization may be randomly divided into a number of groups. It will be appreciated that defining groups of users based on different criteria may be required for providing targeted and effective training vectors for each of the users in the group of users.

Throughout the present disclosure, the term "vectors" as used in "received vectors", "calibration vectors", "set of simulated vectors", and "threat vectors" refers to communications that are received in the user device from different communication sources, and further represents a data structure of such communications. The term "vector" includes information about content of received communications as well as origin and destination address of the same. It will be appreciated that the term "vector" is used to refer to map the communications in a vector space model that is known in art, which is an algebraic model, involving two steps. In a first step, the text of the communication (for example, email) is represented into vector of words and in a second step, the vector of words is transformed into a numerical format such that text mining techniques such as information retrieval, information extraction, information filtering and so forth may be applied to the vectors. Such a technique makes the system faster as the system receives a large number of communications that are received in the system. Hereinafter, the term "vector" is used throughout the disclosure to refer to any form of communications that are received in the user device.

The server arrangement is configured to send one or more calibration vectors to each of the user devices associated with the users in the group of users. In an example, the server arrangement is configured to determine a destination address for a particular user device via an email or IP address of the particular device and send the calibration vectors to the user device. Throughout the present disclosure the term "calibration vectors" as used herein refers to vectors or artificially created situations containing non-malicious content masquerading a cyber-attack on the user device, and are the vectors that are provided to each of the users for the first time to estimate an initial level of awareness towards cyber-attacks. Optionally calibration vectors can be used randomly in different skill levels for user performance level estimation as there are thousands of iterations on vectors with thousands of users. Notably, the calibration vectors are presented to each of the users in a manner to lure the user into performing an action on the calibration vector and to determine user susceptibility to different types of cybersecurity threats based on the actions performed as a response to the calibration vectors. Further, the calibration vectors also help in selectively identifying set of simulated vectors that will be presented to each of the users in the group of users for training thus making it possible also to predict future performance of users. Examples of calibration vectors, which may be performed by the server arrangement, include the sending of phishing messages, the insertion of redirection commands or popups into Hypertext Transfer Protocol (HTTP) responses, certificate injections, and attempts to install an application on the user device. Each of the user in the group of users is associated with a user device, and the server arrangement is configured to send one or more calibration vectors to each of the user device associated therewith. Optionally, the server arrangement is configured to send one or more calibration vectors wirelessly over the communication network.

The server arrangement is configured to receive, from the user devices, one or more actions performed on each of the one or more calibration vectors by each of the users in the group of users. The one or more actions performed on each of the calibration vectors include action performed using a laptop, phone, tablet or other mobile electronic device having wireless data communication activity; or using a particular mobile electronic device such as an organization-issued device. Furthermore, the one or more actions performed on the calibration vectors include, but are not limited to, downloading software or installing a memory device containing software, connecting to a wireless network, connecting to a short-range or near-field communication-enabled device, replying to an SMS message, placing or receiving a phone call using certain technology, or other activities such as performing a triggering action such as clicking on an embedded URL in the one or more calibration vectors, replying to the one or more calibration vectors, not responding to the one or more calibration vectors and so forth. According to disclosure one or more actions can also refer to non-action i.e. if one or more users in a group of users do not provide an action it is deemed to be as received an action of type "non-action performed".

Optionally, the system further comprises various sensory devices including hardware, software, electromechanical devices, bio-sensory devices, installed in the user device to record one or more actions of the user or behavior, in the context of routine activities or in response to calibration vectors. The sensors may detect various actions of the user in response to the calibration vectors, such as downloading an attachment or installing an application, the browsing history of the user, and other actions. In an example, the actions performed on any of the one or more calibration vectors may be a positive action such as reporting the calibration vector; and a negative action such as performing an undesirable action on the received calibration vector, for instance, clicking on a malicious URL. Notably, the actions performed by each of the users in the group of users determines an awareness level relating to general awareness about cyber-attacks and cybersecurity of each of the users in the groups of users. As an example each user is sent one calibration vector as an email comprising text "your hard disk is full, please download this software to increase capacity". If a user clicks the link provided in the email, it is an indicator of education level of the users (i.e. not good since the link might be malicious).

According to an embodiment, the server arrangement is further configured to analyze the received actions performed on the one or more calibration vectors, via the associated user device, by each of the users to determine an awareness score for each of the user in the group of users. The term "awareness score" as used herein is used to quantify the awareness level of each of the users based on the action performed on the one or more calibration vectors. Optionally, the awareness score may be any non-negative number that may be determined based on the actions performed on the one or more calibration vectors. Optionally the awareness score may be a non-linear function in temporal, spatial or contextual dimensions. In an example, five calibration vectors, namely a first calibration vector, a second calibration vector, a third calibration vector, a fourth calibration vector and a fifth calibration vector are provided to a user, then the user may perform different actions on each of the five calibration vectors. For example, the user may perform a positive action on the first calibration vector, a negative action on the second calibration vector, a positive action on the third calibration vector, a negative action on the fourth calibration vector, and a negative action on the fifth calibration vector. Each of these actions are aggregated to determine a non-negative number indicating the awareness score for the user. It will be appreciated that the first calibration vector, the second calibration vector, the third calibration vector, the fourth calibration vector and the fifth calibration vector may have a same difficulty level or may have different difficulty levels. Henceforth, the awareness score is determined accordingly based on difficulty levels of the calibration vectors taking into consideration individual user's role, location, skills, and past performance.

Optionally, each of the one or more calibration vectors provided to each of the users in the group of users may belong to different categories. It will be appreciated that the actions performed on the one or more calibration vectors by the users may be different for different categories of calibration vectors provided to the users. Notably, when different categories of calibration vectors are provided to users in the group of users, the same user may perform a different action on different categories of calibration vectors indicating different awareness levels for different categories of calibration vectors, thereby determining the susceptibility of the user towards different categories of cyber-attacks. Optionally, different categories of the calibration vectors may include, but are not limited man-in-the-middle attack, phishing and spear phishing attacks, drive-by attack, password attack, SQL injection attack, cross-site scripting (XSS) attack, eavesdropping attack, and malware attack. In an example, the user may perform a positive action or a negative action on a calibration vector. Notably, in a case when the user performs a positive action on the calibration vector, then the awareness score increases. In another case, when the user performs a negative action on a calibration vector, then the awareness score decreases. Optionally, the actions of each of the users are stored in the database arrangement in a structured manner.

The server arrangement is configured to allocate each user in the group of users to one of sub-groups based on the received actions, wherein each of the sub-groups is associated with an expertise level. It will be appreciated that the group of users can be further divided into different sub-groups based on the actions performed by each of the users on the one or more calibration vectors. Throughout the present disclosure, the term "expertise level" as used herein refers to a quantitative and/or qualitative measure of susceptibility to various cyber-attacks. Notably, each of the sub-groups have a predefined expertise level to which users can be allocated based on the actions performed on the one or more calibration vectors. In addition, users may have multiple skill disciplines for which they have associated skill whereas expertise level dimensions are not just based on difficulty level as such but difficulty in certain skills being trained. For an example knowledge and skills are different for people working in different company departments such as Management (CxO), HR, Legal, Finance, IT, Operations, Sales, Marketing, or Customer support. Skills to be trained include e.g. what information attackers are using, attack theme, attack type, attack category, etc. whereas trained skills are different depending on attacking phases that include attack planning, attack preparation, attack exploitation and attack post-exploitation phases. In an example, the expertise level is range of numerical values defining a particular expertise level. Optionally, in one or more embodiments, the different sub-groups may have predefined expertise levels arranged in an orderly manner, increasing expertise level or decreasing expertise level.

Optionally, the number of sub-groups the users could be divided depending on the number of employees in the organization. For example, if a company has 5 users in the first group, sub-groups can be divided as 1+4, 2+3, 3+2, etc. in any combination, such that minimum number of users in any sub-group is 1. It may be appreciated that there is no actual limit of sub-groups to which the user could be part of, as users live in continuous variable space. Optionally, the total number of sub-groups into which the group of users is divided are based on a total number of calibration vectors. In an example, for a total of five calibration vectors provided to the group of users, the total number of sub-groups into which the group of users can possibly be divided will be equal to 32. In another example, for a total of 3 calibration vectors provided to the group of users, the total number of sub-groups into which the group of users can be divided will be equal to 8. Similarly, for a total of "n" calibration vectors, the total number of sub-groups into which the group of users can be divided will be equal to $2^n$.

According to an embodiment, the server arrangement is configured to allocate each user in the group of users to at least one of the sub-groups, based on the corresponding awareness score mapping with the expertise level of a particular sub-group. It is to be understood that in order to allocate a particular user to one of the sub-groups, the awareness score of the particular user is compared with the expertise level of each of the sub-groups in order to determine the corresponding sub-group to which the particular user is to be allocated. For example, consider three sub-groups, namely a first sub-group, a second sub-group, and a third sub-group. The first sub-group having an expertise level 0-5, the second sub-group having an expertise level 6-11, and the third sub-group having an expertise level 11-16. Herein, in such a case, one or more users having the awareness score 4 will be allocated to the first sub-group. In another case, one or more users having the awareness score 8 will be allocated to the second sub-group. In yet another case, one or more users having the awareness score 16 will be allocated to the third sub-group. It should be noted that the above explained method of allocation of users to one or more sub-groups is merely a simplified example for the same. However, the process of determination of awareness score, expertise levels and corresponding allocation to different sub-groups requires extensive multivariate non-linear data analysis between various inputs and outputs and data processing deducing an algorithm for the same. There are several data processing techniques possible known in the art that may be employed for analyzing the awareness scores, expertise levels and to efficiently allocate one or more users to different sub-groups, which have not been explained herein for the brevity of the present disclosure.

According to an embodiment, the system further comprises a plugin, in the form of a user-interface element. The term "plugin" as used herein refers to are software additions, add-ons that allow for the customization of computer programs, apps, and web browsers; as well as the customization of the content offered by various web pages. The term "user-interface" as used herein refers to a structured set of user interface elements rendered on a display screen. Optionally, the user interface (UI) rendered on the display screen is generated by any collection or set of instructions executable by an associated digital system. Additionally, the user interface (UI) is operable to interact with the user to convey graphical and/or textual information and receive input from the user. Specifically, the user interface (UI) used herein is a graphical user interface (GUI). Furthermore, the user interface (UI) elements refer to visual objects that have a size and position in user interface (UI). A user interface control is considered to be a user interface element. Text blocks, labels, text boxes, list boxes, lines, and images windows, dialog boxes, frames, panels, menus, buttons, icons, etc. are examples of user interface elements. In addition to size and position, a user interface element may have other properties, such as a margin, spacing, or the like. In an example, a plugin can be provided in different web pages that the user is most likely to receive threats from, such as web pages linked to emails, and other frequently browsed web pages. The plugin is adapted to be implemented by a user to report any of received vectors in a user device associated therewith. Notably, the received vector may be any one of calibration vectors, simulated vectors, threat vectors, and training vectors. According to an additional or alternative embodiment, vectors can be translated and localized based on areas or countries. For example, vectors might be different in a company operated in the US than a company located in Germany. Furthermore, usage of contextual user role information in vectors can be used. In addition, information for co-worker data can be used when creating vectors.

Optionally, the server arrangement further comprises three entities, namely, a first entity, a second entity and a third entity that interact with each other during the reporting of the received vector. Herein, the first entity is the plugin in the user device, associated with the user reporting the received vector. The second entity is an application program interface (API), in communication with the first entity, i.e. the plugin in the user device. The third entity is a server application, in communication with the second entity, i.e. the application program interface (API) in the user device. Notably, different set of instructions or signals are exchanged among the three entities for a simulated vector and a threat vector, when received in the user device.

In a case when the received vector is a simulated vector and is reported by the user, the plugin in the user device sends a signal requesting authorization tokens from the application program interface. The API acknowledges the request and sends a signal returning the authorization tokens for verification. Further, consecutive to verification, the plugin sends a signal requesting for origin information of the received vector. In response, the API sends a signal returning the origin information to the plugin. The plugin verifies that the received vector is a simulated vector by comparing the received information with the predefined origin information. Further, once it is verified that the received vector is a simulated vector, the plugin sends a signal to the server application further requesting instructions using the origin information of the received vector and the authorization token information based on the action performed by the user. In response, the server application sends a signal for returning instructions to redirect the user to a progress report page generated by the server arrangement.

In another case, when the received vector is a threat vector that is reported by the user, the plugin sends a signal requesting authorization tokens from the application program interface (API). The API acknowledges the request and sends a signal returning the authorization tokens for verification. Further, consecutive to verification, the plugin sends a signal requesting for origin information of the received vector. The API sends a signal returning the origin information to the plugin in the user device. The plugin identifies that the received vector is a threat vector by comparing the received information with the predefined origin information. Further, once it is verified that the received vector is a threat vector, the plugin sends a signal to the server application requesting further instructions using the origin information of the received vector and the authorization token information based on the action performed by the user. In response, the server application sends a signal requesting permission from the user to further report the threat vector. Further, the plugin sends a signal to the API requesting full content of the threat vector. In response, the API sends a signal to the plugin returning the requested content of the threat vector. Further, the plugin sends a signal to the server application requesting to upload the full content to the server arrangement for threat analysis. In response, the server application sends a signal as acknowledgement.

The server arrangement is configured to send a set of simulated vectors to each of the user devices associated with users allocated to a particular sub-group. Throughout the present disclosure the term "simulated vectors" as used herein refers to vectors or artificially created situations containing non-malicious content masquerading a cyber-attack on the user device, and are the vectors that are provided to each of the users based on the determined awareness score of each of the user. The set of simulated vectors are aimed at providing training to each of the users in different sub-groups. It may be appreciated that the calibration vectors are technically same as simulated vectors, but can be seen as reference vectors, that are sent to the user for the first time to assess the awareness of the user. The actions performed on calibration vectors form as a basis or a reference for the system to decide, which set of simulated vectors must be sent for training him/her. And, once awareness level has been determined using calibration vectors, then simulated vectors are sent. That is, simulated vectors are targeted vectors, aimed at providing targeted training to users. In an example, the set of simulated vectors used with a first sub-group of users with higher expertise level are more difficult/challenging than the set of simulated vectors used with a second sub-group of users with relatively lower expertise level. This is because otherwise the users in the second sub-group would not learn at all or would stop responding if they do not recognize attacks based on their skills.

Notably, the set of simulated vectors are presented to each of the users in a manner to lure the user into performing an action on the simulated vector and constantly monitor actions performed on each of the simulated vectors, thereby indicating an improvement in awareness of the user for different forms of cyber-attacks. Further, the simulated vectors also help in selectively determining a progress of a particular user and thereby determining different simulated vectors to be provided to the user for further training. Examples of simulated vectors, which may be performed by the server arrangement, include the sending of phishing messages, the insertion of redirection commands or popups into Hypertext Transfer Protocol (HTTP) responses, certificate injections, and attempts to install an application on the user device. In particular, the server arrangement is configured to generate the set of simulated vectors for each of the sub-groups. Herein, the set of simulated vectors pertains to a difficulty level corresponding to the expertise level of the sub-group. Notably, different set of simulated vectors are generated for different sub-groups having different difficulty level corresponding to the expertise level of each of the sub-groups.

The server arrangement is configured to receive, from the user devices, one or more actions performed on each of the simulated vectors in the set of simulated vectors by each of the users in the sub-groups. The received actions performed on each of the simulated vectors include action performed using a laptop, phone, tablet or other mobile electronic device having wireless data communication activity; or using a particular mobile electronic device such as an organization-issued device. Furthermore, the actions performed on each of the simulated vectors include, but are not limited to, downloading software or installing a memory device containing software, connecting to a wireless network, connecting to a short-range or near-field communication-enabled device, replying to an SMS message, placing or receiving a phone call using certain technology, or other activities such as performing a triggering action such as clicking on an embedded URL in the one or more simulated vectors, replying to the one or more simulated vectors, reporting the one or more simulated vectors via the plugin, and so forth. That is, receiving or collecting the responses can be done for example by having an extension in a browser or plugin in an email application or a similar type of one-button reporting tool which provides "report phishing activity" or "Report this email" button. The users are requested to press the button if they observe a threat.

Optionally, the aforementioned sensory devices installed in the user device are configured to record the one or more actions of the user or behavior, in the context of routine activities or in response to the simulated vectors. The sensors may detect various actions of the user in response to the simulated vectors, such as downloading an attachment or installing an application, the browsing history of the user, and other actions. In an example, the actions performed on any of the one or more simulated vectors may be a positive action such as reporting the simulated vector, and a negative action such as performing an undesirable action on the received simulated vector including clicking on an embedded link and the like.

Optionally, the plugin in the form of user-interface element is also configured to provide an embedded training when the user performs a negative action on the simulated vector. For example, when the user is unsuccessful in detecting a threat, the user is presented with a training module explaining details related to the simulated vector, highlighting the critical learning points about the simulated vector. For example, the embedded training presented to the user may include a nature of attack used by the simulated vector, methods and masquerading technique used by the simulated vector, and how the user may detect the threat in future. The embedded training may also be presented through a combination of types of trainings including, for example, a delivery of a combination of just-in-time training modules to the user, training assignments to be completed by the user by assigned dates or times, interactive training modules and recommendations for further training of the user. Optionally, the server arrangement is also configured to generate a progress report for each of the user. The progress report displays several parameters indicating a performance of the user over a period of time. Examples of different parameters include, but are not limited to, a total number of threat vectors reported over a period of time, a total number of simulated vectors reported over a period of time, and one or more rewards earned over a period of time.

According to an embodiment, the server arrangement is further configured to record the actions performed on each of the simulated vectors, via the associated user device, by each of the users allocated to different sub-groups over a period of time. Further, the server arrangement is configured to update the awareness score of each of the user in each of the sub-groups based on the recorded actions over the period of time. Notably, the awareness score of each of the user changes over a period of time as the user constantly receives training through the simulated vectors. The awareness of the user towards different methods and techniques of the cyber-attacks may increase over a period of time, and therefore the awareness score is also updated over the period of time. Further, the server arrangement is configured to re-allocate one or more users to at least one of the sub-groups, based on the corresponding updated awareness score mapping with the expertise level of the particular sub-group. It will be appreciated that the awareness score of the user is increased or decreased based on the actions performed on each of the simulated vectors, and subsequently the updated awareness score is mapped with each of the expertise level in order to re-allocate the user to a different sub-group.

The server arrangement is configured to define a threshold expertise level for the sub-groups. The threshold expertise level is a measure to define that the one or more users allocated to the sub-groups having the expertise level above the threshold expertise level are more skilled in detecting threats than the one or more users allocated to the sub-groups having the expertise level below the threshold expertise level. Optionally, the threshold expertise level can be defined automatically by the server arrangement based on presently known threats, and the awareness score of each of the users in the group of users. Notably, the threshold expertise level is defined collectively for all the sub-groups in the group.

The server arrangement is configured to receive, from the user devices, one or more threat vectors reported by one or more users allocated to the sub-groups having the expertise level above the threshold expertise level. Throughout the present disclosure, the term "threat vectors" as used herein refers to real world, non-simulated vectors, and having malicious content therein. The threat vectors may be any of the known threats, or an entirely new form of unknown threat. It may be appreciated that those real-world threats that are successfully reported by one or more users allocated to the sub-groups having the expertise level above the threshold expertise level are considered as threat vectors since these users can be reliably considered to identify real-world threats, in the present context. Further, the server arrangement is configured to update the set of simulated vectors based on the received threat vectors. Optionally, when the threat vector is reported, a threat vector report is generated comprising a number of details of the reported threat vector such as an origin information, a nature of attack, a type of attack, and so forth. The set of simulated vectors are generated based on the generated threat vector reports such that the set of simulated vectors mimic the reported threat vectors. Notably, the simulated vectors are used for purpose of training, and simulated vectors are further updated based on threat vectors, such that the users are trained based on constantly updated threats. Further, the server arrangement is configured to use the updated set of simulated vectors as training vectors for the each of the users allocated to a particular sub-group to improve cybersecurity. Further using of updated set of simulated vectors further improves communication network performance as the security vectors are sent to relevant groups.

According to an embodiment, the server arrangement is further configured to compare origin information of the received vector with a predefined origin information. Herein the origin information primarily refers to a domain name or IP address of the received vector. Alternatively, the origin information may also include a name of the protocol used as the primary access medium, a sub-domain name, a path to a specific page or file within a domain, a network port to use to make a connection, a specific reference point within the received vector, such as a named anchor in an HTML file; and a query or search parameters used. Notably, the one or more simulated vectors and calibration vectors primarily used for training different users have predefined origin information as the one or more simulated vectors and calibration vectors originate from the server arrangement, thereby having a fixed or known IP address. The comparison of origin information of the received vector with the predefined origin information determines an authenticity of the received vector. Further, the server arrangement is configured to categorize a received vector as a simulated vector, if the origin information of the received vector is same as that of the predefined origin information. In such a case, when the received vector is identified as a simulated vector, the user is presented with the aforementioned embedded training and aforementioned progress report exclusive to the user. In this case, the received vector needs not be analyzed further. Optionally, the server arrangement is configured to categorize a received vector as a threat vector, if the origin information of the received vector is different from that of the predefined origin information. In this case, the received vector is sent to the server arrangement for further analysis of a full content of the received vector to search for potential malicious content. In one or more cases, alarm may be raised to alert other users in the organization, if the received vector is the first level of attack. It will be appreciated that such a system enables efficient filtering of simulated vectors and threat vectors as and when reported by the one or more users.

According to an embodiment, the server arrangement is further configured to perform one or more preventive actions in response to the threat vectors categorized as the first level of attack. In this context, the one or more preventive actions are performed by the server arrangement to prevent the user devices from a cyber-attack, for example phishing. Notably, the users in the sub-group having a lower expertise level can provide more general, e.g. non-time critical responses which can be used to identify e.g. a simple spam that also is reported as phishing. The users in a sub-group having a higher expertise level are more skillful and they are able to provide fast responses about real threats as a first instance making responses also statistically more accurate. This makes it possible to make preventing critical maintenance actions much faster, in a near real-time. Herein, the "one or more preventive actions" refers to actions performed by the server arrangement in response to the received threat vectors that are reported by users having a higher expertise level and thereby, categorized as the first level of attack. The preventive actions to block attacks can be, but are not limited to, e.g. a firewall/proxy configuration, an SMTP port configuration or an email server configuration, configuration or even closing of email accounts or to egress traffic from company to be able to quickly block a connection to a malicious site. Further the preventive actions may remove a malware or an affected software in the end point devices (mobiles, tablet PCs, laptops, desktops, servers etc.). Further, the server arrangement is also configured to access a database arrangement to acquire one or more known cyber-attacks, for example phishing methods and distinguish between a real harmful threat or attack or a simple spam. The server arrangement is configured to constantly update the database arrangement with latest known cyberattack methods, as discussed later in the description.

According to an embodiment, the server arrangement is further configured to record a time of reception of the received vector in the user device associated with the user. The time of reception is recorded by the server arrangement in a local time zone of the location of the user device associated with the user. In an example, the time of reception is the time when the corresponding user device detects the incoming of the received vector. In another example, the time of reception is the time when the user acknowledges the reception of the received vector in the associated user device. Further, the server arrangement is configured to record a time of action by the user, via the associated user device, on the received vector. The time of action is also recorded by the server arrangement in the local time zone of the location of the user device associated with the user as failures have very high temporal element in them. In an example, the time of action is the time when the user responds to the received vector by performing an action (i.e., a positive action or a negative action) on the received vector. Further, the server arrangement is configured to calculate a time difference between the reception of the received vector and the action performed on the received vector. Further, the server arrangement is configured to update the awareness score of each of the users in the group of users based on the calculated time difference. Notably, the calculated time difference between the reception of the received vector and the action performed on the received vector determines the awareness of a particular user for the received vector. In an example, the awareness score increases when the time difference between the reception of the received vector and the action performed on the received vector is less. In other words, when the user performs a positive action on the received vector, i.e. if the user takes less time to report the received vector as a threat, then the awareness score increases accordingly. In another example, the awareness score decreases when the time difference between the reception of the received vector and the action performed on the received vector is high. In other words, when the user performs a positive action on the received vector, i.e. if the user takes more time to report the received vector as a threat, then the awareness score decreases accordingly. In deed above way to use the calculated time difference to update the awareness score provides way to update the system without increasing calculation requirements of the system. According to one alternative embodiment, vectors are created based on a correct time-zone and working hours of the group of users. In another example, sending vectors in a correct time zone normalized to a user primarily optimizes training results, i.e. a user receiving a training in the morning or daytime is more likely to increase in performance vs. receiving the training at night-time. Operating in correct time zone enables better user engagement, faster training and better protection as users have better expertise level. Thus localized training in different time zones optimizes mass email sending in separate time intervals, makes time difference comparison calculations faster with less calculation power, and needs less data communication between servers located in different time zones.

It will be appreciated that different users in the organization pertaining to different roles are susceptible to different types of threats. Therefore, it is beneficial to categorize the users in the group of users into one or more different classes for a more distinctive and targeted training of each of the users. In an example, if the particular user is a human resource manager, then the user is more susceptible to receive threats relating to fake CVs and the like. In another example, if the particular user is a chief finance officer, then the user is more susceptible to receive threats relating to fake invoices.

The server arrangement is further configured to categorize each of the users in the group of users into one or more classes pertaining to a role of the user in the organization. The different roles in the organization include, but are not limited to chief executive officer, chief technical officer, chief marketing officer, sales manager, production manager, human resource manager, board of directors and shareholders. Further, the server arrangement is configured to identify specific threats for each of the one or more classes. Notably, the one or more classes are susceptible to different types of threats, and therefore, specific threats for each of the one or more classes are identified. Herein, the server arrangement takes into account commonly exploited social engineering to determine potential sources that a particular user is susceptible to receive threats from. The server arrangement also determines a nature of attack that the given user is more susceptible to. Further, the server arrangement is further configured to generate different sets of simulated vectors for different classes of users simulating the corresponding identified specific threats.

According to an embodiment, the server arrangement is further configured to associate each of one or more simulated vectors with different categories corresponding to different classes of known threats. The different classes of known threats may include, but are not limited to, man-in-the-middle attack, phishing and spear phishing attacks, drive-by attack, password attack, SQL injection attack, cross-site scripting (XSS) attack, eavesdropping attack, and malware attack. In particular, each of the one or more simulated vectors are tagged under different categories corresponding to different classes of known threats. Further, the server arrangement is configured to record the actions of each of the users in the group of users corresponding to the provided set of simulated vectors associated with each of the different categories over a period of time. Notably, the same user may perform different actions on different simulation vectors of different categories. It will be appreciated that such a system is beneficial in determining the performance of the users in each of the different categories of the simulated vectors. Further, the define a performance score for each of the users in the group of users for each of the different categories based on the recorded actions. Herein, the performance score is the measure to quantify the awareness of each of the user in different categories of the simulated vector. Further, the server arrangement is configured to send the set of simulated vectors associated with a particular category to one or more users in the group of users having the performance score below a threshold performance score for the particular category. Herein, the threshold performance score is the value below which the users do not have an adequate awareness about cybersecurity attacks in a particular category. Therefore, the one or more users having the performance score below the threshold performance score for a particular category are provided with the set of simulated vectors of the same category. It will be appreciated that such a system ensures that the users receive simulated training vectors for the categories they are weak at, thereby providing a customized training for each of the users.

The server arrangement is further configured train a machine learning algorithm based on the actions of each of the users in different sub-groups having the expertise level above the threshold expertise level. The machine learning algorithm is trained in order to simulate the actions of each of the users in different sub-groups having the expertise level above the threshold expertise level. It will be appreciated that each of the users in different sub-groups having the expertise level above the threshold expertise level are skilled in detecting and reporting received vectors as threat vectors or simulated vectors based on the nature of the received vectors. Therefore, the machine learning algorithm is constantly trained to simulate actions performed by each of the users in different sub-groups having the expertise level above the threshold expertise level.

Throughout the present disclosure, the term "machine learning algorithm" as used herein refers to software-based algorithms that are executable upon computing hardware and are operable to adapt and adjust their operating parameters in an adaptive manner depending upon information that is presented to the software-based algorithms when executed upon the computing hardware. Optionally, the machine learning algorithms include neural networks such as recurrent neural networks, recursive neural networks, feed-forward neural networks, convolutional neural networks, deep belief networks, and convolutional deep belief networks; self-organizing maps; deep Boltzmann machines; and stacked de-noising auto-encoders. Optionally, the machine learning algorithms employ any one or combination of the following computational techniques: constraint program, fuzzy logic, classification, symbolic manipulation, fuzzy set theory, evolutionary computation, cybernetics, data mining, approximate reasoning, derivative-free optimization, decision trees, or soft computing. Moreover, the term "neural network" as used herein can include a highly interconnected network of processing elements, each optionally associated with a local memory. In an example, the neural network may be Kohonen map, multi-layer perceptron and so forth. Furthermore, the processing elements of the neural networks can be "artificial neural units", "artificial neurons", "neural units", "neurons", "nodes" and the like. Moreover, the neuron can receive data from an input or one or more other neurons, process the data, and send processed data to an output or yet one or more other neurons. The neural network or one or more neurons thereof can be generated in either hardware, software, or a combination of hardware and software, and the neural network can be subsequently trained. It will be appreciated that as the server arrangement implements machine learning algorithms, more the number of training datasets available for training the machine learning algorithm, greater is the accuracy of the system in defending cyber-attacks based on the actions of each of the users in different sub-groups having the expertise level above the threshold expertise level.

Optionally, the machine learning algorithm is trained to develop an automated defense system against evolving cyber-attacks. The data for evolving cyber-attack in the form of threat intel may be collected from several, for example over hundred, open source intelligence sources (OSINT) (e.g. 1 TB/day). For example, the data may include true positive data from threat sources providing labelled indicators of compromise (URL, IP, File), true negative data providing labelled data for legitimate data sources such as actual sites, emails, domains of actual companies used and targeted by attackers, etc. All the data is retrieved from different sources and normalized to from a data structure and consequently stored in the database arrangement. The database arrangement is constantly updated for new and evolving threats. Optionally, the machine learning algorithm is used to update the simulation vectors. In an example, different sets of simulated vectors are generated based on the evolving threats from the database arrangement. Further, such simulated vectors are provided to each of the users in the group of users, and actions performed by each of the users in different sub-groups having the expertise level above the threshold expertise level are recorded to train the machine learning algorithm to improve cybersecurity in real-time. Further, the machine learning algorithm providing the automated defense system is used to perform the one or more preventive actions, such as blocking of threats, upgrading the firewall and so forth, depending on the data as retrieved from the database arrangement comprising constantly updating new and evolving threats globally.

Further, the present disclosure provides a threat assessment and response platform using the machine learning algorithm as aforementioned and large-scale human input to build a highly efficient tool for detecting and blocking cyber-attacks, such as phishing attacks. Notably, the human input data comes from the system which is the cybersecurity awareness training platform that uses machine learning to build unique individual training paths for each user, by generating targeted set of simulated vectors. As aforementioned, the system is configured to generate a proprietary and unique database arrangement of a large number of reported threats, that is constantly updated with the newest attack methods globally.

Optionally, as aforementioned, the server arrangement is configured to develop an automated defense system in communication with the database arrangement, developed using the machine learning algorithm as mentioned above. Several techniques, data processing methods and threat analysis techniques are used to determine a threat level of different vectors. In an example, such a technique provides detection of text lures by using multilingual Natural Language Processing (NLP) to detect imperative classes/content from textual content within emails such as "click here", "act now", "urgent" and the like. The machine learning algorithm provides information if given text contains a call to action. Advanced NLP methods are also used to detect slight arbitrary variations that are often used by phishing attackers to circumvent traditional cybersecurity systems and methods. In another example, such a technique may be look-alike domain detection technique that detects whether a given e-mail sender domain is employing look-a like-attacks such as homograph attack. The technique uses a combination of deep convolutional neural network based heuristic algorithms to give score whether the given domain is employing said techniques. In another example, such a technique is a brand impersonation detection technique. As it is known, that advanced spear phishing threat vectors are typically masqueraded to come from a trusted source such as a well-known brand or co-worker. This technique gives an indication of probability for whether such a trusted source is potentially being impersonated. Deep neural network methods called Single Shot Multibox Detector and YOLOv3 are used to detect if a known brand logo or other insignia is visible in any given threat vector. In yet another example, such a technique may include determining a social graph of the individual or employee, that is used to detect if a given communication from a co-worker is likely to come from the indicated source. This gives a powerful feature to detect business email compromises. If there is no regular social connection between the target and the potentially impersonated co-worker, more confidence can be gained that it is a true attack. The latest state of the organization's social graph is collected by monitoring the organization's email flows at the sender-to-recipient level. In yet another example, such a technique may include Incident of Compromise (IOC) Scoring. The model rates each IOC (IP, URL, File) for its probability of being malicious. Several support vector machine (SVM) and decision tree-based classification algorithms are evaluated for this problem, and train these machine learning algorithms with previously collected OSINT data. Furthermore, the system may further be implemented as payload detonation chamber by utilizing open source tools such as Cuckoo Sandbox13 for assessment of threat vectors, if any included URLs or attachments contain cyber-threats.

For combining these models, a method called "stacking ensemble is used for deep learning" to train a deep neural network which will give a rating and confidence on each reported threat. Essentially, a model is trained which learns how to best combine the predictions from multiple existing models. With this final model, reported threats are prioritized and the system automatically removes and blocks threats above certain significance from the whole database. The same model and data are used for training users. With the knowledge of the newest attack methods it also is possible to teach users more efficiently to make them resilient to the latest attacks in cybersecurity space. Finally, the model is used to evaluate the threat level of training vectors to test if e.g. an internal red team (trained white-hat hackers, i.e., computer security experts) can build attacks that fool the AI model in use, and push to develop and explore new areas of attacks which cannot be detected by the AI model in use.

The present disclosure also relates to the method of improving cybersecurity. Various embodiments and variants disclosed above apply mutatis mutandis to the method.

Optionally, the method further comprises analyzing each of the received actions performed on the one or more calibration vectors, via the associated user device, by each of the user to determine an awareness score for each of the user in the group of users; and allocating each of the user in the group of users to at least one of the sub-groups, based on the corresponding awareness score mapping with the expertise level of a particular sub-group.

Optionally, the method further comprises recording the actions performed on each of the simulated vectors, via the associated user device, by each of the users allocated to different sub-groups over a period of time; updating the awareness score of each of the user in each of the sub-groups based on the recorded actions over the period of time; and re-allocating one or more users to at least one of the sub-groups, based on the corresponding updated awareness score mapping with the expertise level of the particular sub-group.

Optionally, the method further comprises providing a plugin, in the form of a user-interface element, wherein the plugin is adapted to be implemented by a user to report any of received vectors in a user device associated therewith.

Optionally, the method further comprises categorizing the threat vector as a first level of attack, if the threat vector is reported, via the associated user device, by one or more users allocated to sub-groups having the expertise level above the threshold expertise level; and categorizing the threat vector as a second level of attack, if the threat vector is reported, via the associated user device, by one or more users allocated to sub-groups having the expertise level below the threshold expertise level.

Optionally, the method further comprises performing one or more preventive actions in response to the threat vectors categorized as the first level of attack.

Optionally, the method further comprises comparing origin information of received vector with a predefined origin information; categorizing the received vector as a simulated vector, if the source of origin information of the received vector is same as that of the predefined origin information; and categorizing the received vector as a threat vector, if the source of origin information of the received vector is different from that of the predefined origin information.

Optionally, the method further comprises associating each of the simulated vectors with different categories corresponding to different classes of known threats; recording the actions performed, via the associated user device, by each of the users in the group of users corresponding to the provided set of simulated vectors associated with each of the different categories over a period of time; defining a performance score for each of the users in the group of users for each of the different categories based on the recorded actions; and sending the set of simulated vectors associated with a particular category to one or more users in the group of users having the performance score below a threshold performance score for the particular category.

Optionally, the method further comprises recording a time of reception of the received vector in the user device associated with the user; recording a time of action by the user, via the associated user device, on the received vector; calculating a time difference between the reception of the received vector and the action performed on the received vector; and updating the awareness score of each of the users in the group of users based on the calculated time difference.

Optionally, the method further comprises categorizing each of the users in the group of users into one or more classes pertaining to a role of the user in the organization; identifying specific threats for each of the one or more classes; and generating different sets of simulated vectors for different classes of users simulating the corresponding identified specific threats.

Optionally, the method further comprises training a machine learning algorithm based on the actions of each of the users in different sub-groups having the expertise level above the threshold expertise level.

Optionally, the method further comprises using the machine learning algorithm for updating the set of simulated vectors.

Despite all the statistics that point to phishing already being one of the worst cybersecurity threats and still rapidly growing in pervasiveness, the essential human factor in phishing has prevented the creation of effective remedies to the problem. It may not be possible to build highly effective training program for all individuals within an organization without the help of automation. For example, an organization which might have 50 different roles, within 10 different divisions, within 12 different countries combined with 400 vectors, for typical awareness program consisting of 12 sessions would need to evaluate manually 50×10×12×400×12=28800000 choices, which is not practical.

The present disclosure solves this problem by combining the latest advances in artificial intelligence (AI) research with service design methods that turn the organization's employees into willing and capable allies in the task to stop phishing. That is, the organizations can turn their employees into threat sensors and allocate them to different cybersecurity groups based on their skills. The system and method of the present disclosure makes it possible to reach near real-time threat analysis, sandboxing, and remediation. Using threat scoring, it is possible to identify accurate estimates of the current threat level facing the organization. The present system and method simulate phishing attacks (vectors) that are indistinguishable from real threats. Following on, a gamified reporting experience is rewarding users (employees) for reporting both simulated and real attacks, highlighting their success. There is a possibility to make reporting faster in relative to local time zone. That is, if the vector is sent relative to user's time zone at 't0' and the user report at 't1', then time taken 'd'=t1−t0 which will give the model information about the user (collected over time). The present disclosure further enables to build a unique and constantly updating database of the latest phishing methods. With such a kind data resource, it is possible to distinguish between real threats and simple spam that also get reported as phishing.

The system and method of the present disclosure can be used by any organization or individual to fend off attacks and increase security awareness. The invention is the first threat assessment and response platform using state-of-the-art machine learning technologies and large-scale human input to build a highly efficient tool for detecting and blocking phishing attacks. The large global scale human input enables to outperform all current methods which lack the component of human data input. The invention is related to reducing significantly the risk of users falling for social engineering attacks. The invention can be used for example by large multinational organization to harden their employees automatically. System will train and monitor employees during the employees' life-cycle within the company. As a result, the present disclosure helps to stop cyber-attacks ranging from ransomware to behavior influencing campaigns by adversarial nation states. By automating reported threat analysis, the system and method of the present disclosure enables an organization to act accurately and efficiently against threat in real-time. Data shows that users report average 6 threats per week. In a large organization of 3000 users that would mean 18000 reports to be managed monthly which would cause heavy congestion in their Security Operations Center (SOC). By automated grouping where similar threats are considered as single incident and by filtering lower level threats (such as ordinary spam), the present system can provide SOC with only the relevant threats which allows them to act on those in a prompt manner.

DETAILED DESCRIPTION OF THE DRAWINGS

Referring to FIG. 1, illustrated is a schematic illustration of an exemplary environment 100 of a system for improving cybersecurity in an organization, in accordance with an embodiment of the present disclosure. As illustrated, the system 100 for improving cybersecurity comprises a server arrangement 102, a database arrangement 104 communicatively coupled to the server arrangement 102, one or more user devices, namely a first user device 106A, a second user device 106B, and a third user device 106C associated with corresponding users of the system 100. Herein, the user devices 106A, 106B and 106C communicate with the server arrangement 102 via the communication network 108.

FIG. 1 is merely an example, which should not unduly limit the scope of the claims herein. It is to be understood that the specific designation for the system 100 is provided as an example and is not to be construed as limiting the system 100 to specific numbers of server arrangements, database arrangements and user devices. A person skilled in the art will recognize many variations, alternatives, and modifications of embodiments of the present disclosure.

Figure 2A:
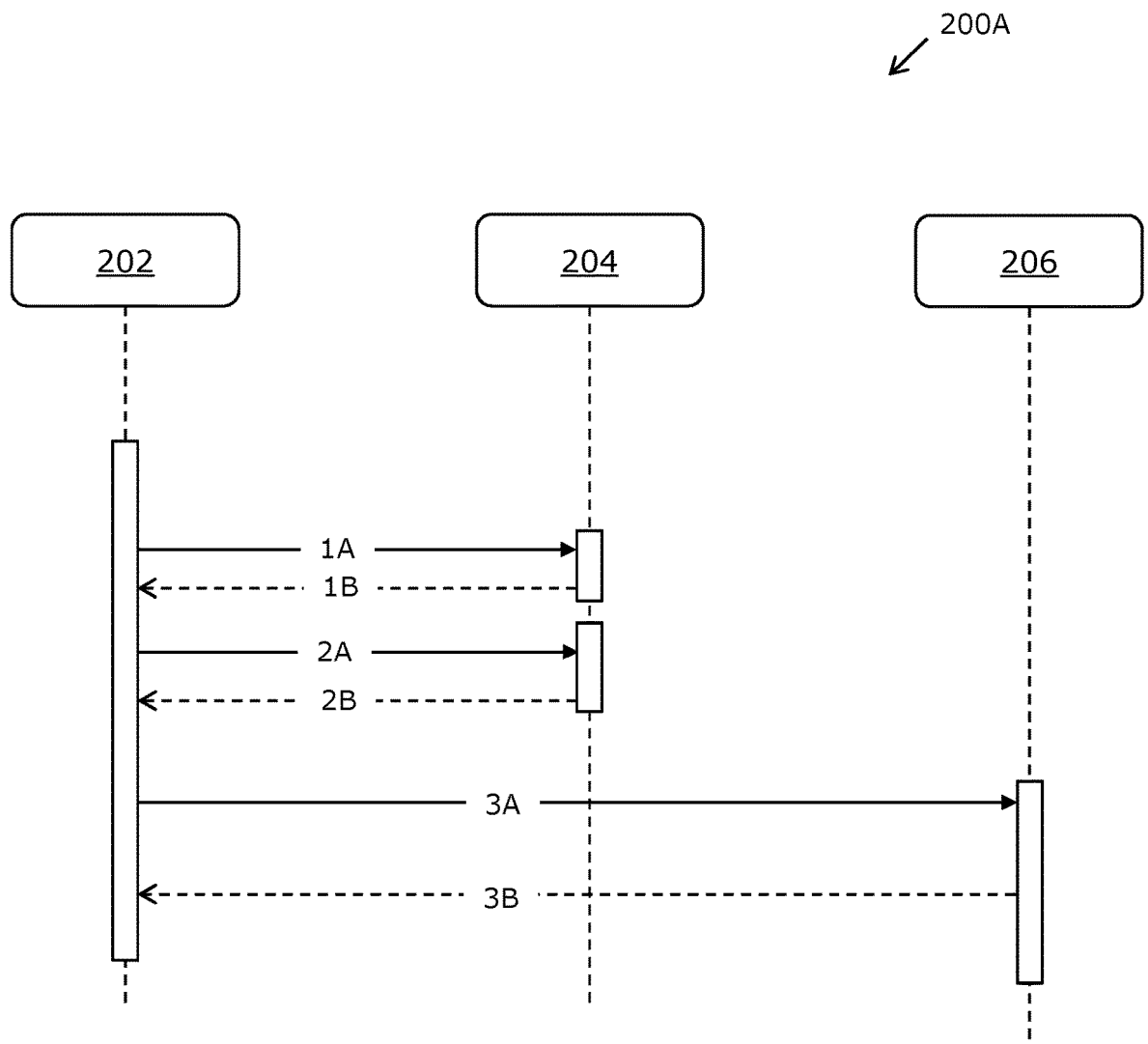
FIGS. 2A and 2B are schematic illustrations of a data flow diagram representing reporting flow for a received vector, in accordance with various embodiments of the present disclosure.
Figure 2B:
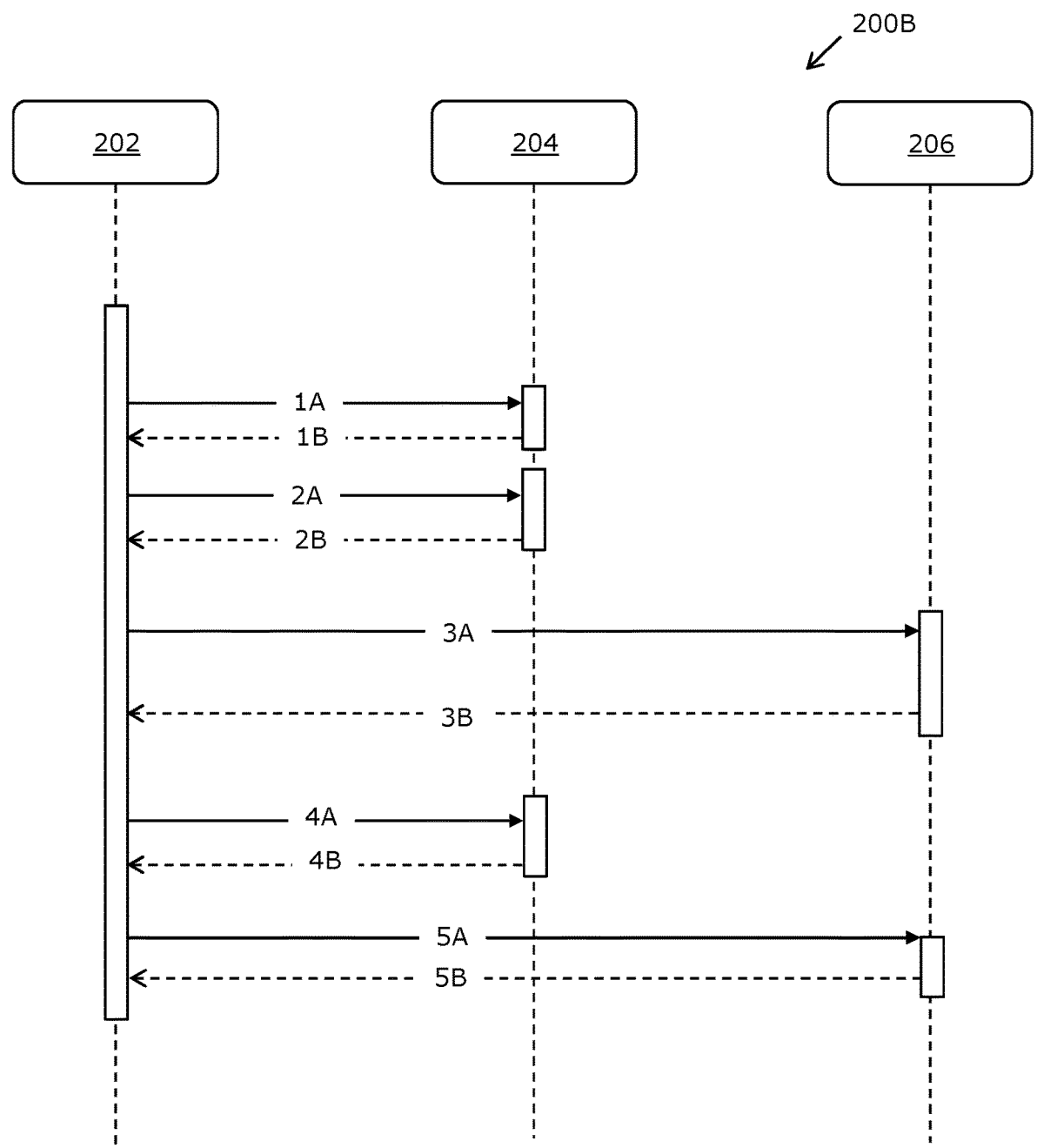

Referring to FIGS. 2A and 2B, illustrated is a schematic illustration of a data flow diagram 200A, 200B representing reporting flow for a received vector, in accordance with various embodiments of the present disclosure. As shown, three entities, namely a first entity 202, a second entity 204, and a third entity 206 interact with each other during the reporting of the received vector. Herein, the first entity 202 is a plugin in the user device (not shown), associated with the user reporting a received vector. The second entity 204 is an application program interface (API), in communication with the first entity 202. The third entity 206 is a server application, in communication with the second entity 204.

As shown in FIG. 2A, illustrated is a data flow diagram 200A representing reporting flow for a simulated vector. When the received vector is reported by the user, the first entity 202 send a signal "1A" requesting authorization tokens from the second entity 204. The second entity 204 acknowledges the request and sends a signal "1B" returning the authorization tokens for verification. Further, consecutive to verification, the first entity 202 sends a signal "2A" requesting for origin information of the received vector. The second entity 204 sends a signal "2B" returning the origin information to the first entity 202. The first entity 202 verifies that the received vector is a simulated vector by comparing the received information with the predefined origin information. Further, once it is verified that the received vector is a simulated vector, the first entity 202 sends a signal "3A" to the third entity 206 further requesting instructions using the origin information of the received vector and the authorization token information based on the action performed by the user. In response, the third entity 206 sends a signal "3B" returning instructions to redirect the user to a progress report page generated by the server arrangement.

As shown in FIG. 2B, illustrated is a data flow diagram 200B representing reporting flow for a threat vector. When the received vector is reported by the user, the first entity 202 sends a signal "1A" requesting authorization tokens from the second entity 204. The second entity 204 acknowledges the request and sends a signal "1B" returning the authorization tokens for verification. Further, consecutive to verification, the first entity 202 sends a signal "2A" requesting for origin information of the received vector. The second entity 104 sends a signal "2B" returning the origin information to the first entity 202. The first entity 202 identifies that the received vector is a threat vector by comparing the received information with the predefined origin information. Further, once it is verified that the received vector is a threat vector, the first entity 202 sends a signal "3A" to the third entity 206 requesting further instructions using the origin information of the received vector and the authorization token information based on the action performed by the user. In response, the third entity 206 sends a signal "3B" requesting permission from the user to further report the threat vector. Further, the first entity 202 sends a signal "4A" to the second entity 204 requesting full content of the threat vector. In response, the second entity 104 sends a signal "4B" to the first entity 202 returning the requested content of the threat vector. Further, the first entity 202 sends a signal "5A" to the third entity 206 requesting to upload the full content to the server arrangement for threat analysis. In response, the third entity 206 sends a signal "5B" as acknowledgement.

Figure 3:
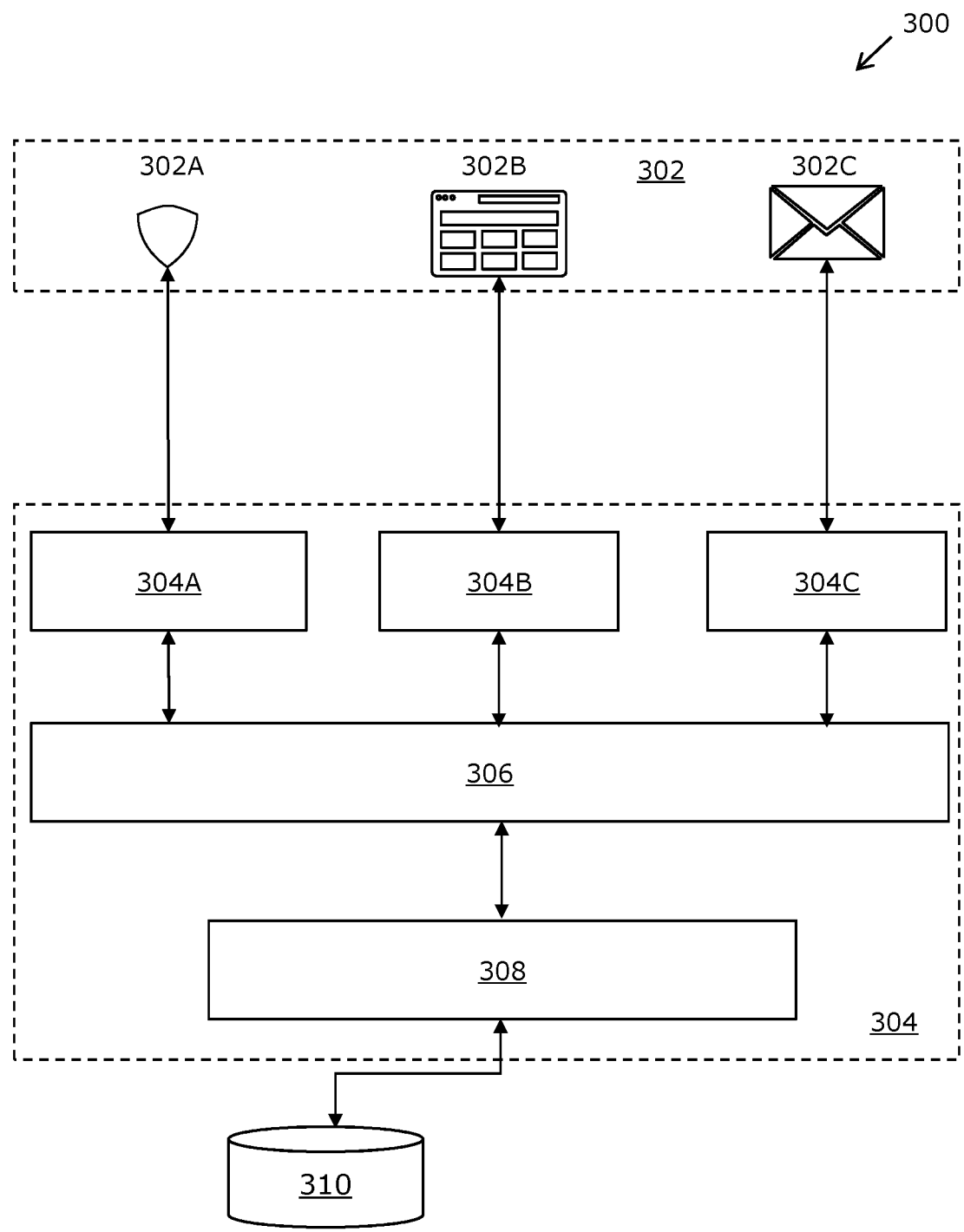
FIG. 3 is a schematic illustration of an exemplary architecture of the system, in accordance with an embodiment of the present disclosure.

Referring to FIG. 3, illustrated is an exemplary architecture of a system 300 (such as, the system 100 of FIG. 1), in accordance with an embodiment of the present disclosure. The system 300 provides multiple interaction layers for reporting a received vector. As shown, the system 300 comprises a user device 302 (such as, any one of the user devices 106A, 106B and 106C of FIG. 1) comprising a user plugin 302A, a web browser 302B, and an email server 302C. The system 300 further comprises a server arrangement 304 (such as, the server arrangement 102 of FIG. 1) in communication with the user device 302, via a communication network (such as, the communication network 108 of FIG. 1, not shown in FIG. 3). The server arrangement 304 comprises a plugin application program interface (API) 304A, a web application 304B, and an email transfer agent 304C. As shown, the user plugin 302A interacts with the plugin application program interface (API) 304A, the web browser 302B interacts with the web application 304B, and the email server 302C interacts with the email transfer agent 304C. That is, the plugin application program interface (API) 304A helps to establish communication between the server arrangement 304 and the user plugin 302A (installed on the user device 305), the web application 304B helps to establish communication between the server arrangement 304 and the web browser 302B (installed on the user device 305), and the email transfer agent 304C helps to establish communication between the server arrangement 304 and the email server 302C (installed on the user device 305). As further illustrated, the server arrangement 304 also comprises an internal application program interface layer 306 and a database layer 308. Also, the system 300 comprises a database arrangement 310. Herein, the server arrangement 304 interacts via the internal application program interface layer 306, which in turn interacts with the database layer 308, to establish communication with the database arrangement 310 (such as, the database arrangement 104 of FIG. 1).

Figure 4:
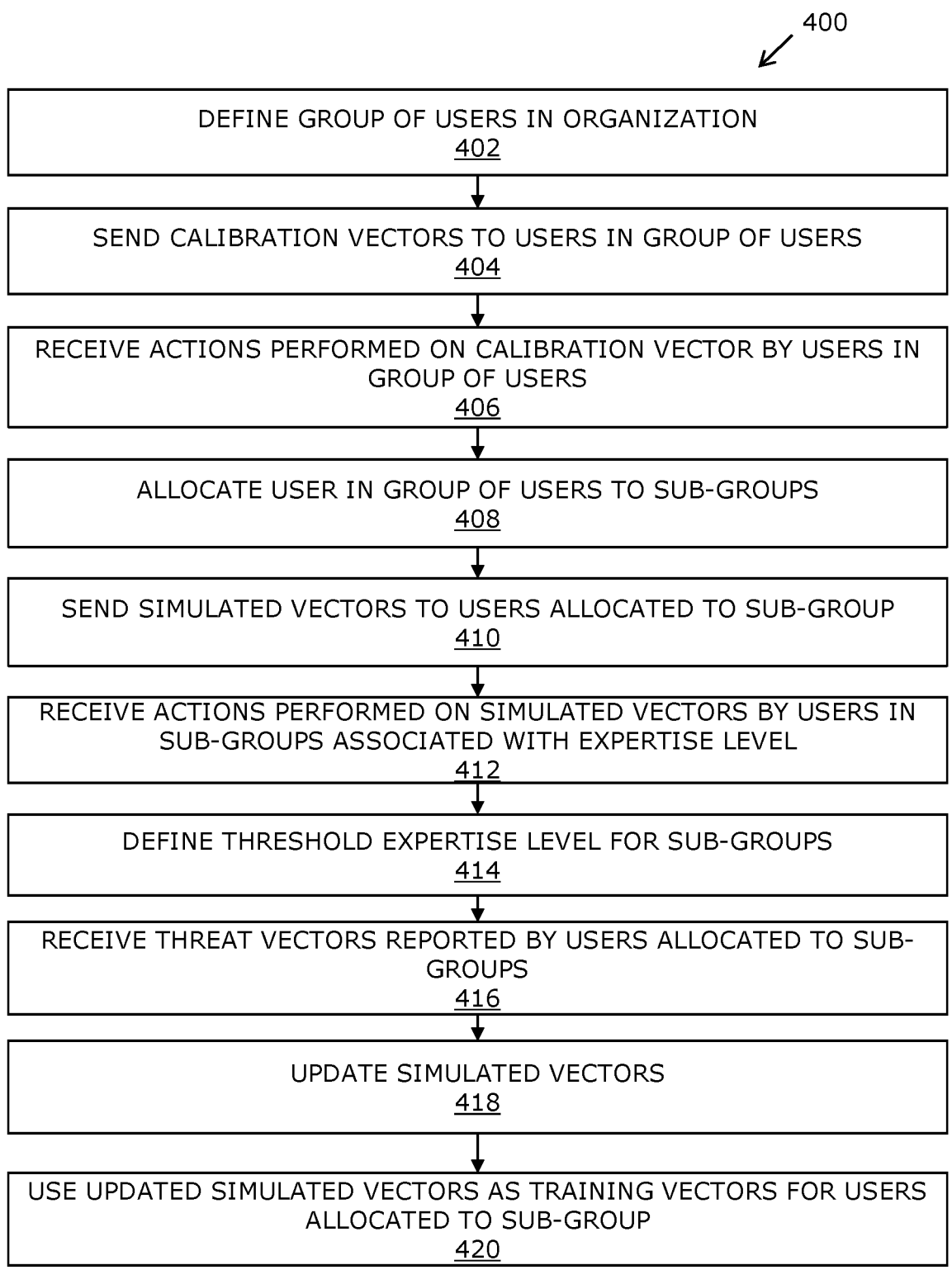
FIG. 4 is a schematic illustration of a flowchart depicting steps of a method for improving cybersecurity in an organization, in accordance with an embodiment of the present disclosure.

Referring to FIG. 4, illustrated is a flowchart 400 depicting steps of a method for improving cybersecurity in an organization, in accordance with an embodiment of the present disclosure. At step 402, a group of users is defined in the organization. At step 404, one or more calibration vectors are sent to each of the users in the group of users. At step 406, actions performed on each of the one or more calibration vectors by each of the users in the group of users are received. At step 408, each of the user in the group of users is allocated to one of sub-groups based on the received actions, wherein each of the sub-groups is associated with an expertise level. At step 410, a set of simulated vectors are sent to each of the users allocated to a particular sub-group, wherein the set of simulated vectors pertains to a difficulty level corresponding to the expertise level of the sub-group. At step 412, actions performed on each of the simulated vectors in the set of simulated vectors by each of the users in the sub-groups are received. At step 414, a threshold expertise level for the sub-groups is defined. At step 416, one or more threat vectors reported by one or more users allocated to the sub-groups having the expertise level above the threshold expertise level are received. At step 418, the set of simulated vectors are updated based on the received threat vector. At step 420, the updated set of simulated vectors are used as training vectors for the each of the users allocated to a particular sub-group to improve cybersecurity.

The steps 402 to 420 are only illustrative and other alternatives can also be provided where one or more steps are added, one or more steps are removed, or one or more steps are provided in a different sequence without departing from the scope of the claims herein.

Figure 5A:
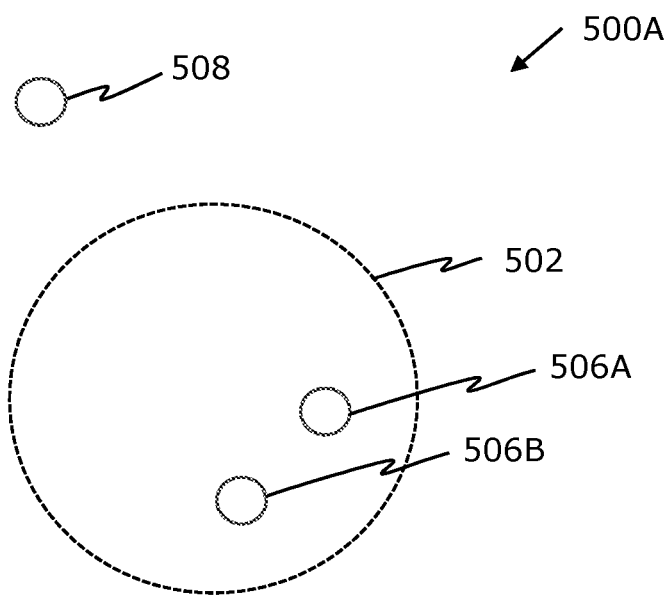
FIGS. 5A and 5B are illustrations of two types of training systems describing effect on training difficulty, in accordance with an embodiment of the present disclosure.
Figure 5B:
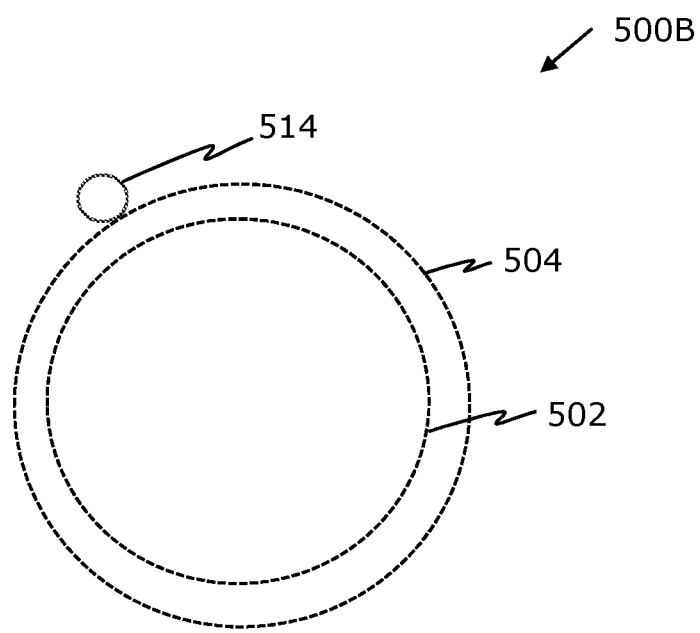

Referring to FIGS. 5A and 5B, illustrated are two types of training methods describing effect on training difficulty. FIG. 5A describes a one type of training method 500A where a user receives either too difficult training events (vectors) 508 or too easy training events (vectors) 506A, 506B. FIG. 5B describes individual training method 500B where a user receives its expertise level optimised training event (vectors). Expertise levels 502 and 504 refer to a quantitative and/or qualitative measure of susceptibility to various cyber-attacks in which the expertise level 502 is lower and the expertise level 504 is higher.

As discussed, FIG. 5A is an illustration of the training method 500A in which a user with the expertise level 502 receives either too difficult training events 508 or too easy training events 506A, 506B, which in turn frustrate and demotivate users not to continue training. Too difficult training event 508 creates a Fear, Uncertainty, and Doubt, often shortened to FUD. The FUD effect is associated in negative results in training efficiency.

Further, as discussed, FIG. 5B is an illustration of the training method 500B in which a user with the expertise level 502 receives optimised training event 514 that is not too difficult or not too easy compared to the expertise level 502. As a result, the user improves from the expertise level 502 to a next expertise level 504. This type of training method keeps users motivated to continuously learn more.

Figure 6:
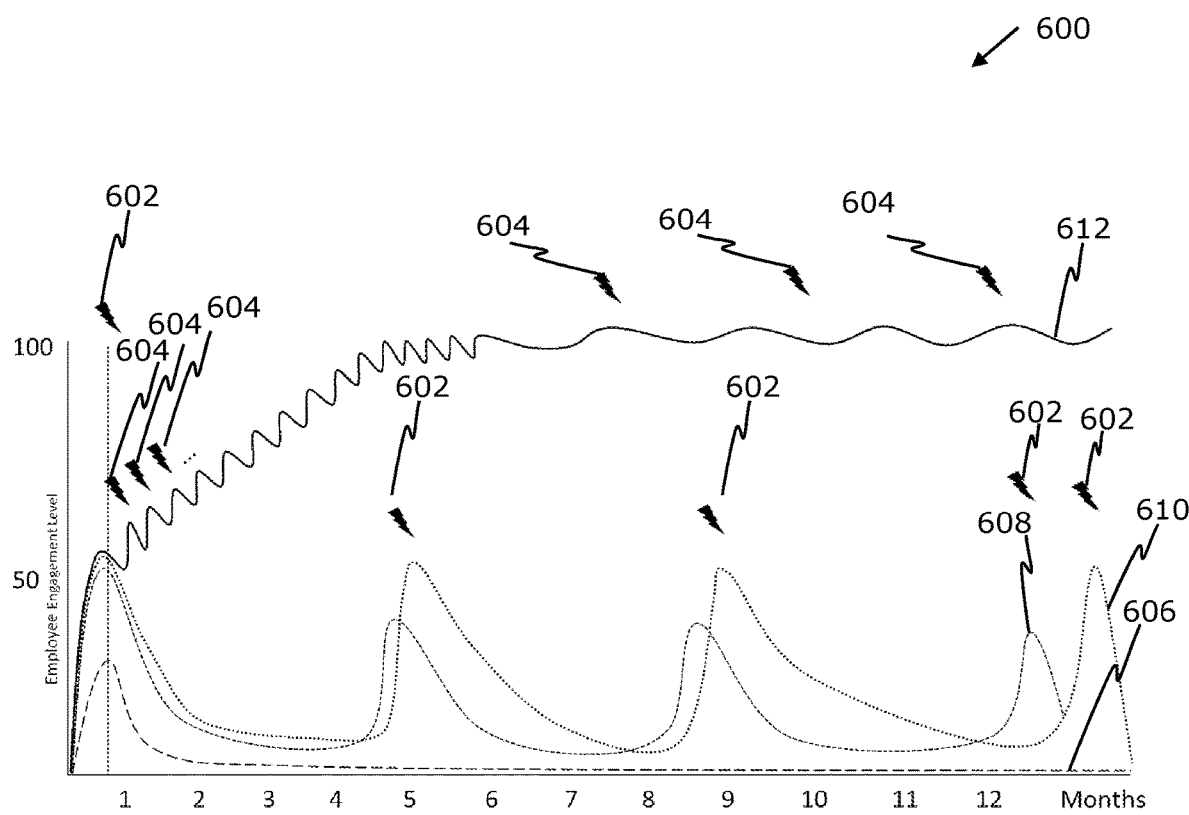
FIG. 6 is a graphical representations of different training models and their efficiencies in employee engagement, in accordance with an embodiment of the present disclosure.

Referring to FIG. 6, illustrated is an example graphical representation of different training models and their efficiency. As shown, X-axis depicts time in months and Y-axis depicts an employee engagement level on scale from 0 to 100. A classroom type of training 606 indicates only one training event 602 showing its inefficiency to keep engagement level. Same happens with an E-Learning interactive modules 608 which are great for compliance tasks but seen as a mandatory bad thing in employees' eyes interrupting work and known to be difficult to get employees to complete. Quarterly or similar manual recurring Phishing Campaigns 610 includes heavy training moments whereas an education material is received only through failure events making it inefficient. Continuous individual learning 612 contains several micro training moments 604 whereas training is received through success in identifying and in reporting cybersecurity attacks keeping engagement level high from the beginning.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for improving cybersecurity in an organization, the system comprising a server arrangement configured to:
define a group of users in the organization, each user in the group of users associated with a user device;
send one or more calibration vectors to each of the user devices;

receive, from the user devices, one or more actions performed on each of the one or more calibration vectors by each user in the group of users;

allocate each user in the group of users to one of sub-groups based on the received one or more actions, wherein each of the sub-groups is associated with an expertise level;

send a set of simulated vectors to each of the user devices associated with users allocated to a particular sub-group, wherein the set of simulated vectors pertains to a difficulty level corresponding to the expertise level of the sub-group;

receive, from the user devices, one or more actions performed on each of the simulated vectors in the set of simulated vectors by each of the users in the sub-groups;

define a threshold expertise level for the sub-groups;

receive, from the user devices, one or more threat vectors reported by one or more users allocated to the sub-groups having the expertise level above the threshold expertise level;

update the set of simulated vectors based on the received one or more threat vectors; and use the updated set of simulated vectors as training vectors for the each of the users allocated to the particular sub-group to improve cybersecurity.

2. The system according to claim 1, wherein the server arrangement is further configured to:

analyze the received one or more actions performed on the one or more calibration vectors, via the associated user device, by each user in the group of the users to determine an awareness score for each user in the group of users; and allocate each user in the group of users to at least one of the sub-groups, based on the corresponding awareness score mapping with the expertise level of the particular sub-group.

3. The system according to claim 2, wherein the server arrangement is further configured to:

record the one or more actions performed on each of the simulated vectors, via the associated user device, by each user allocated to different sub-groups over a period of time;

update the awareness score of each user in each of the sub-groups based on the recorded one or more actions over the period of time; and re-allocate one or more users to at least one of the sub-groups, based on the corresponding updated awareness score mapping with the expertise level of the particular sub-group.

4. The system according to claim 1, further comprising a plugin, in a form of a user-interface element, wherein the plugin is configured to be implemented by a user to report any of received vectors in the user device associated therewith.

5. The system according to claim 1, wherein the server arrangement is further configured to:

categorize the one or more threat vectors as a first level of attack, if the one or more threat vectors are reported, via the associated user device, by the one or more users allocated to the sub-groups having the expertise level above the threshold expertise level; and categorize the one or more threat vectors as a second level of attack, if the one or more threat vectors are reported, via the associated user device, by one or more users allocated to sub-groups having the expertise level below the threshold expertise level.

6. The system according to claim 5, wherein the server arrangement is further configured to perform one or more preventive actions in response to the one or more threat vectors categorized as the first level of attack.

7. The system according to claim 1, wherein the server arrangement is further configured to:

compare origin information of a received vector with a predefined origin information;

categorize the received vector as the simulated vector in the set of simulated vectors, if the origin information of the received vector is same as that of the predefined origin information; and categorize the received vector as a threat vector, if the origin information of the received vector is different from that of the predefined origin information.

8. The system according to claim 1, wherein the server arrangement is further configured to:

associate each of the simulated vectors with different categories corresponding to different classes of known threats;

record the one ore more actions performed, via the associated user device, by each user in the group of users corresponding to the provided set of simulated vectors associated with each of the different categories over a period of time;

define a performance score for each user in the group of users for each of the different categories based on the recorded one ore more actions; and send the set of simulated vectors associated with a particular category to one or more users in the group of users having the performance score below a threshold performance score for the particular category.

9. The system according to claim 1, wherein the server arrangement is further configured to:

record a time of reception of a received vector in the user device associated with the user;

record a time of action by the user, via the associated user device, on the received vector;

calculate a time difference between the time of reception of the received vector and the time of action performed on the received vector; and update an awareness score of each user in the group of users based on the calculated time difference.

10. The system according to claim 1, wherein the server arrangement is further configured to:

categorize each user in the group of users into one or more classes pertaining to a role of each user in the group of users in the organization;

identify specific threats for each of the one or more classes; and generate different sets of simulated vectors for different classes of users simulating the corresponding identified specific threats.

11. The system according to claim 1, wherein the server arrangement is further configured to train a machine learning algorithm based on the one or more actions of each user in different sub-groups having the expertise level above the threshold expertise level.

12. The system according to claim 11, wherein the machine learning algorithm is used to update the set of simulated vectors.

13. A method for improving cybersecurity in an organization, the method comprising:

defining a group of users in the organization, each user in the group of users associated with a user device;

sending one or more calibration vectors to each of the user devices;

receiving, from the user device, one or more actions performed on each of the one or more calibration vectors by each user in the group of users;

allocating each user in the group of users to one of sub-groups based on the received one or more actions, wherein each of the sub-groups is associated with an expertise level;

sending a set of simulated vectors to each of the user devices associated with users allocated to a particular sub-group, wherein the set of simulated vectors pertains to a difficulty level corresponding to the expertise level of the sub-group;

receiving, from the user devices, one or more actions performed on each of the simulated vectors in the set of simulated vectors by each of the users in the sub-groups;

defining a threshold expertise level for the sub-groups;

receiving, from the user devices, one or more threat vectors reported by one or more users allocated to the sub-groups having the expertise level above the threshold expertise level;

updating the set of simulated vectors based on the received one or more threat vectors; and using the updated set of simulated vectors as training vectors for the each of the users allocated to the particular sub-group to improve cybersecurity.

14. The method according to claim 13, further comprising:

analyzing the received one or more actions performed on the one or more calibration vectors, via the associated user device, by each user in the group of users to determine an awareness score for each user in the group of users; and allocating each user in the group of users to at least one of the sub-groups, based on the corresponding awareness score mapping with the expertise level of a particular sub-group.

15. The method according to claim 14, further comprising:

recording the one or more actions performed on each of the simulated vectors, via the associated user device, by each user allocated to different sub-groups over a period of time;

updating the awareness score of each user in each of the sub-groups based on the recorded one or more actions over the period of time; and re-allocating one or more users to at least one of the sub-groups, based on the corresponding updated awareness score mapping with the expertise level of the particular sub-group.

16. The method according to claim 13, further comprising providing a plugin, in a form of a user-interface element, wherein the plugin is configured to be implemented by a user to report any of received vectors in a user device associated therewith.

17. The method according to claim 13, further comprising:

categorizing the one or more threat vectors as a first level of attack, if the one or more threat vectors are reported, via the associated user device, by the one or more users allocated to the sub-groups having the expertise level above the threshold expertise level; and categorizing the one or more threat vectors as a second level of attack, if the one or more threat vectors are reported, via the associated user device, by one or more users allocated to sub-groups having the expertise level below the threshold expertise level.

18. The method according to claim 17, further comprising performing one or more preventive actions in response to the one or more threat vectors categorized as the first level of attack.

19. The method according to claim 13, further comprising:

comparing origin information of a received vector with a predefined origin information;

categorizing the received vector as the simulated vector in the set of simulated vectors, if a source of the origin information of the received vector is same as that of the predefined origin information; and categorizing the received vector as a threat vector, if the source of origin information of the received vector is different from that of the predefined origin information.

20. The method according to claim 13, further comprising:

associating each of the simulated vectors with different categories corresponding to different classes of known threats;

recording the one or more actions performed, via the associated user device, by each user in the group of users corresponding to the provided set of simulated vectors associated with each of the different categories over a period of time;

defining a performance score for each user in the group of users for each of the different categories based on the recorded one or more actions; and sending the set of simulated vectors associated with a particular category to one or more users in the group of users having the performance score below a threshold performance score for the particular category.

21. The method according to claim 13, further comprising:

recording a time of reception of a received vector in the user device associated with the user;

recording a time of action by the user, via the associated user device, on the received vector;

calculating a time difference between the time of reception of the received vector and the time of action performed on the received vector; and updating the awareness score of each user in the group of users based on the calculated time difference.

22. The method according to claim 13, further comprising:

categorizing each user in the group of users into one or more classes pertaining to a role of each user in the organization;

identifying specific threats for each of the one or more classes; and generating different sets of simulated vectors for different classes of users simulating the corresponding identified specific threats.

23. The method according to claim 13, further comprising training a machine learning algorithm based on the one or more actions of each user in different sub-groups having the expertise level above the threshold expertise level.

24. The method according to claim 23, further comprising using the machine learning algorithm for updating the set of simulated vectors.

* * * * *